Patented May 4, 1948

2,440,810

UNITED STATES PATENT OFFICE 2,440,810

PURIFICATION OF TETRAETHYL LEAD

Alfred Edwin Parmelee, Wilmington, Del., assignor to E. I. du Pont de Nemours & Company, Wilmington, Del., a corporation of Delaware No Drawing. Original application May 29, 1943, Serial No. 489,067. Divided and this application April 12, 1946, Serial No. 661,883

8 Claims. (Cl. 260—437)

This invention relates to the purification of tetra ethyl lead and more particularly to the process of removing sludge-forming impurities from the tetra ethyl lead.

In the commercial process of manufacturing tetra ethyl lead and other tetra alkyl lead compounds, lead is reacted with sodium to form a lead monosodium alloy. This alloy is then reacted with ethyl chloride or with a mixture of ethyl chloride and methyl chloride. After the reaction is complete the tetra ethyl lead and other tetra alkyl lead compounds are removed from the reaction mass by steam distillation. Small quantities of finely divided metallic lead and inorganic solids are carried over with the tetra alkyl lead in the steam distillation. Such solid suspended materials may be removed by the method disclosed in my prior Patent No. 1,975,171.

The lead, employed in such process, usually contains small amounts of bismuth and other metallic impurities. Such impurities, especially the bismuth, also react with the ethyl chloride to form organo-metallic compounds which are carried over with the tetra alkyl lead in the steam distillation. These other organo-metallic compounds are less stable than the tetra ethyl lead and tend to decompose and form sludge which settles in the bottom of tank cars, drums, tanks and the like. This sludge will contain up to about 70% bismuth compounds, up to about 20% lead compounds and small amounts of compounds of other metals. The amount of sludge, obtainable from all of the sludge-forming impurities present in any sample of tetra alkyl lead, is termed the potential sludge content of such sample.

This sludge is objectionable. Frequently, the sludge is highly inflammable and very reactive on exposure to air. It contains substantial amounts of adsorbed tetra alkyl lead which is always poisonous and hazardous to handle. The sludge, when deposited in tank cars, drums, tanks, etc., must be periodically removed. The removal and disposal of such sludge is a hazardous task and requires the use of specially designed equipment and specially trained workers.

The formation of sludge and its removal from tank cars, etc. has long been a problem. It has been proposed to incorporate, in tetra ethyl lead, compounds for inhibiting the formation of sludge. These sludge inhibitors have not proved to be entirely satisfactory and have not solved the problem. Previously proposed methods of purifying the crude tetra ethyl lead have also failed to solve this problem.

In a co-pending application Serial No. 393,680 filed May 15, 1941, jointly by William de Benneville Bertolette and myself, now Patent No. 2,400,383 issued May 14, 1946, it is disclosed that these problems may be very satisfactorily solved by aerating the tetra alkyl lead, whereby the sludge-forming impurities are caused to form sludge in a small space of time. Such sludge is removed from tetra ethyl lead whereupon the tetra ethyl lead is purified by the substantially complete removal of the sludge-forming impurities. While such process is highly successful, it is sometimes desirable to employ other means to remove the sludge-forming materials because of the volatility of the tetra alkyl lead compounds.

It is an object of my invention to overcome the problem of sludge formation in tetra ethyl lead and mixtures containing it. Another object is to provide a method for producing stable tetra ethyl lead compositions. A further object is to provide an improved method of purifying tetra ethyl lead. A still further object is to provide a simple and improved method for removing sludge-forming compounds from crude tetra ethyl lead. Other objects are to provide more stable tetra ethyl lead compositions and to advance the art. Still other objects will appear hereinafter.

The above and other objects may be accomplished in accordance with my invention by washing crude steam distilled tetra ethyl lead, containing sludge-forming impurities, with a weak aqueous solution of certain oxidizing agents which will react with the sludge-forming impurities without causing substantial decomposition of the tetra ethyl lead. I have found that some oxidizing agents, when employed in suitable concentration, will react with the sludge-forming impurities to convert them to insoluble materials or to water-soluble materials or both, without causing substantial decomposition of the tetra ethyl lead. I have found further that, by washing crude tetra ethyl lead with such weak aqueous solutions of such oxidizing agents, it is possible to remove the sludge-forming impurities substantially completely from crude tetra ethyl lead. The tetra ethyl lead, so treated, is substantially purer and is very much more stable in storage.

Amongst the oxidizing agents, which I have found to be effective for my purpose, are the dichromates of the alkali metals and the alkaline earth metals. The sludge-forming impurities, particularly the bismuth compounds, have been successfully removed from crude commercial tetra ethyl lead by washing the tetra ethyl lead with an equal volume of a 1% aqueous solution of each of sodium dichromate and potassium dichromate. Of these oxidizing agents, I have found the alkali metal dichromates to be the most effective and desirable.

Generally, the washing of the tetra ethyl lead, in accordance with my invention, is carried out in the presence of air without any attempt being made to exclude air from the washing equipment, or the washing solution. Some oxidizing agents are substantially ineffective when oxygen, as in the air, is excluded from the equipment and from the washing solution. Even when air or other oxygen-containing gas was excluded, by replacing the air with nitrogen, satisfactory removal of the sludge-forming materials, particularly bismuth compounds, was obtained by treatment with solutions of the dichromates of this invention and particularly by the alkali metal dichromates +1% $H_2SO_4$. By "+1% $H_2SO_4$," I mean that the wash solution contained 1% sulfuric acid.

While all of the oxidizing agents within my invention appear to operate successfully when they are employed in 1% concentration in water, my invention is not to be limited to the use of 1% concentration. Each of the oxidizing agents may be employed in higher or lower concentration, the exact limits of which will vary with the individual oxidizing agent. Sodium dichromate and potassium dichromate have been found effective in concentrations of from 1% to 25% and do not appear to attack the tetra ethyl lead in any of such concentrations. When the alkali metal dichromates are employed in concentrations as low as 0.5%, the quantity of sludge-forming impurities removed from the tetra ethyl lead falls off rapidly. If it is desired to employ the alkali dichromates with the exclusion of air or oxygen, it is desirable to employ them in slightly acid solution, such as that provided by 1% of sulfuric acid, in order to remove the sludge-forming impurities most effectively.

The amount of the aqueous solution to be employed for washing the tetra ethyl lead may be widely varied, it being essential only to employ sufficiently large amounts to provide sufficient oxidizing agent to react with the sludge-forming impurities, particularly the sludge-forming bismuth compounds, present in the tetra ethyl lead. Generally, about one volume of the solution of the oxidizing agent will be sufficient for washing 5 volumes of tetra ethyl lead and removing the sludge-forming impurities therefrom. In other words, at least ⅕ volume of the washing solution should be used for each volume of the tetra ethyl lead. When the oxidizing agent is an alkali metal dichromate, such as sodium dichromate and potassium dichromate, it is generally necessary to employ one-half volume of the solution for each volume of the tetra ethyl lead. In practice, I have found that the best results are obtained by employing approximately one volume of the aqueous solution of the oxidizing agent for each volume of the tetra ethyl lead. Much larger volumes of the washing solution can be employed, but without advantage. Attack of the tetra ethyl lead and of the sludge-forming impurities by the oxidizing agent depends upon the particular oxidizing agent employed and its concentration in the aqueous solution, rather than the amount of aqueous solution employed.

In carrying out the washing of the crude tetra ethyl lead in accordance with my invention, the tetra ethyl lead and the aqueous solution are placed in a suitable container provided with means for agitation. The tetra ethyl lead and the aqueous solution are agitated and mixed together for a period of time, depending upon the effectiveness of the agitation and the activity of the oxidizing agent, sufficient for the oxidizing agent to react with the sludge-forming impurities. In laboratory size experiments, where the materials may be intimately mixed by shaking, only a minute or two is required. In large scale operations, where contact between the two materials is less easily accomplished, one to two hours agitation may be necessary. When the reaction of the oxidizing agent with the sludge-forming materials is complete, the agitation is stopped and the mixture allowed to settle whereupon 2 layers are formed, the lower layer being the purified tetra ethyl lead and the upper layer being the aqueous solution. When the sludge-forming impurities are converted to insoluble materials, they will collect in the aqueous layer mainly at the interface between the two layers. The purified tetra ethyl lead may be drawn off from beneath the water layer. While it is not always necessary to filter the purified tetra ethyl lead, it is generally desirable to filter it so as to insure that no precipitated material will be included in the purified tetra ethyl lead.

It will be understood that the oxidizing agents specifically named are given for illustrative purposes and that various modifications and variations may be made therein without departing from the spirit or scope of my invention. On the other hand, I intend to claim my invention broadly as in the appended claims. While I have disclosed the mixing of the tetra ethyl lead with the desired volume of the aqueous solution in a single operation, and that is the preferred method of practicing my invention, it will be apparent that the tetra ethyl lead can be subjected to successive washings with smaller increments of the washing solution. Also, the washing solution may contain trisodium phosphate or other wetting agent disclosed in my Patent No. 1,975,171 so as to at the same time remove finely divided metallic lead and the like from the tetra ethyl lead and combine the process of this invention with the process of such patent. The use of such wetting agent will aid in dispersing sludge-forming impurities, which have been converted to insoluble materials, in the aqueous solution and aid in the removal of such materials from the tetra ethyl lead.

When the oxidizing agent employed is an alkali metal dichromate, the washing solution may also contain about one to about 2% of a salt such as sodium chloride and sodium acetate to improve the filtering qualities of the precipitated impurities and to overcome the tendency toward the formation of an emulsion between the tetra ethyl lead and the aqueous solution.

Further, the activity of oxidizing agents, such as the dichromates, usually will be improved by employing a small proportion of a non-oxidizing mineral acid, such as about 1% of sulfuric acid or hydrochloric acid in the aqueous solution.

The washing of tetra ethyl lead with the aqueous solutions of oxidizing agents in accordance with my invention may also be employed in combination with the aeration process disclosed in Patent No. 2,400,383. In such case, the oxidizing agents will assist in the oxidation of the sludge-forming impurities by the air even when the oxidizing agents are employed in very low concentrations at which they themselves are ineffective to remove the sludge-forming impurities. Under such conditions, the oxidizing agents appear to act as catalysts in the aeration process.

This application is a division of my copending application Serial No. 489,067, filed May 29, 1943, now Patent No. 2,410,356, issued October 29, 1946.

I claim:

1. The method of purifying steam distilled tetra ethyl lead, containing sludge-forming impurities, which comprises agitating the tetra ethyl lead with at least ½ volume of a weak aqueous solution of an oxidizing agent of the class consisting of the alkali metal dichromates and the alkaline earth metal dichromates for sufficient time for the oxidizing agent to react with the sludge-forming impurities, the concentration of the oxidizing agent in the aqueous solution being from about 1% to about 25%, settling the mixture and separating the tetra ethyl lead from the aqueous solution and the reaction products of the oxidizing agent with the sludge-forming impurities.

2. The method of purifying steam distilled tetra ethyl lead, containing sludge-forming impurities, which comprises agitating the tetra ethyl lead with approximately 1 volume of a weak aqueous solution of an oxidizing agent of the class consisting of the alkali metal dichromates and the alkaline earth metal dichromates for sufficient time for the oxidizing agent to react with the sludge-forming impurities, the concentration of the oxidizing agent in the aqueous solution being from about 1% to about 25%, settling the mixture and separating the tetra ethyl lead from the aqueous solution and the reaction products of the oxidizing agent with the sludge-forming impurities.

3. The method of purifying steam distilled tetra ethyl lead, containing sludge-forming impurities, which comprises agitating the tetra ethyl lead with approximately 1 volume of a weak aqueous solution of an oxidizing agent of the class consisting of the alkali metal dichromates and the alkaline earth metal dichromates for sufficient time for the oxidizing agent to react with the sludge-forming impurities, the concentration of the oxidizing agent in the aqueous solution being approximately 1%, settling the mixture and separating the tetra ethyl lead from the aqueous solution and the reaction products of the oxidizing agent with the sludge-forming impurities.

4. The method of purifying steam distilled tetra ethyl lead, containing sludge-forming impurities, which comprises washing the tetra ethyl lead with at least ½ volume of an aqueous solution of an alkali metal dichromate containing from about 1% to about 25% of alkali metal dichromate.

5. The method of purifying steam distilled tetra ethyl lead, containing sludge-forming impurities, which comprises washing the tetra ethyl lead with approximately 1 volume of an aqueous solution of an alkali metal dichromate containing from about 1% to about 25% of alkali metal dichromate.

6. The method of purifying steam distilled tetra ethyl lead, containing sludge-forming impurities, which comprises washing the tetra ethyl lead with approximately 1 volume of an aqueous solution of an alkali metal dichromate containing about 1% of alkali metal dichromate.

7. The method of purifying steam distilled tetra ethyl lead, containing sludge-forming impurities, which comprises agitating the tetra ethyl lead with approximately 1 volume of a weak aqueous solution of a non-oxidizing mineral acid and an oxidizing agent of the class consisting of the alkali metal dichromates and the alkaline earth metal dichromates for sufficient time for the oxidizing agent to react with the sludge-forming impurities, the concentration of the oxidizing agent in the aqueous solution being from about 1% to about 25%, settling the mixture and separating the tetra ethyl lead from the aqueous solution and the reaction products of the oxidizing agent with the sludge-forming impurities.

8. The method of purifying steam distilled tetra ethyl lead, containing sludge-forming impurities, which comprises washing the tetra ethyl lead with approximately 1 volume of a slightly acidified aqueous solution of an alkali metal dichromate, containing about 1% of an alkali metal dichromate and about 1% of a non-oxidizing mineral acid.

ALFRED EDWIN PARMELEE.

REFERENCES CITED

The following references are of record in the file of this patent:

UNITED STATES PATENTS

| Number | Name | Date |
| --- | --- | --- |
| 1,645,375 | Daudt et al. | Oct. 11, 1927 |
| 1,975,171 | Parmelee | Oct. 2, 1934 |
| 2,004,160 | Downing et al. | June 11, 1935 |
| 2,038,703 | Bake et al. | Apr. 28, 1936 |
| 2,293,214 | Peck | Aug. 18, 1942 |
| 2,400,383 | Bertolette et al. | May 14, 1946 |